US007227668B2

(12) United States Patent
Paul

(10) Patent No.: US 7,227,668 B2
(45) Date of Patent: Jun. 5, 2007

(54) METHOD FOR PRODUCING A MIXED COLOR THAT IS MIXED FROM PRIMARY COLORS AND CORRESPONDS TO A PRESCRIBED TARGET COLOR

(75) Inventor: Andreas Paul, Vaterstetten (DE)

(73) Assignee: Oce Printing Systems GmbH, Poing (DE)

( * ) Notice: Subject to any disclaimer, the term of this patent is extended or adjusted under 35 U.S.C. 154(b) by 1003 days.

(21) Appl. No.: 10/208,469

(22) Filed: Jul. 30, 2002

(65) Prior Publication Data

US 2003/0058463 A1 Mar. 27, 2003

(30) Foreign Application Priority Data

Aug. 30, 2001 (DE) ................................ 101 42 321

(51) Int. Cl.
*G06K 1/00* (2006.01)
*H04N 1/46* (2006.01)

(52) U.S. Cl. ....................... 358/1.9; 358/1.1; 358/1.13; 358/504

(58) Field of Classification Search ................. 358/1.9, 358/1.1, 504, 518, 520, 523, 1.13
See application file for complete search history.

(56) References Cited

U.S. PATENT DOCUMENTS 6,281,984 B1 8/2001 Decker et al.
6,607,258 B2 * 8/2003 Jodra et al. ................... 347/15
6,633,408 B1 * 10/2003 Rozzi ......................... 358/1.9
6,809,837 B1 * 10/2004 Mestha et al. ............... 358/1.9

FOREIGN PATENT DOCUMENTS

DE 199 08 296 8/2000
DE 199 46 585 4/2001

OTHER PUBLICATIONS

International Standard—ISO 12647-2 Dec. 1, 1996—Graphic Technology—Process Control for the Manufacture of Half-tone Colour Separations, Proof and Production Prints.
Billmeyer and Saltzman's Principles of Color Technology—Third Edition—Roy S. Berns.

* cited by examiner

*Primary Examiner*—Madeleine Nguyen
*Assistant Examiner*—Houshang Safaipour
(74) *Attorney, Agent, or Firm*—Schiff Hardin LLP

(57) ABSTRACT

In order to be able to print a prescribed target color with a printing system, the color data of the target color and of the mixed color compounded with parts of the primary colors are compared, and the addition of the parts is varied until adequate similarity has been achieved between the color data of the target color and of the mixed color. In a further step, the mixed color is printed out, the color data of the printed mixed color are identified, and these are compared to those of the target color. Given inadequate similarity, additional parts of the primary colors are added to the mixed color until the respectively printed mixed color has its color data adequately coinciding with the color data of the target color. The mixed color corresponding to the target color is produced from the identified parts and additional parts of the primary colors.

22 Claims, 1 Drawing Sheet

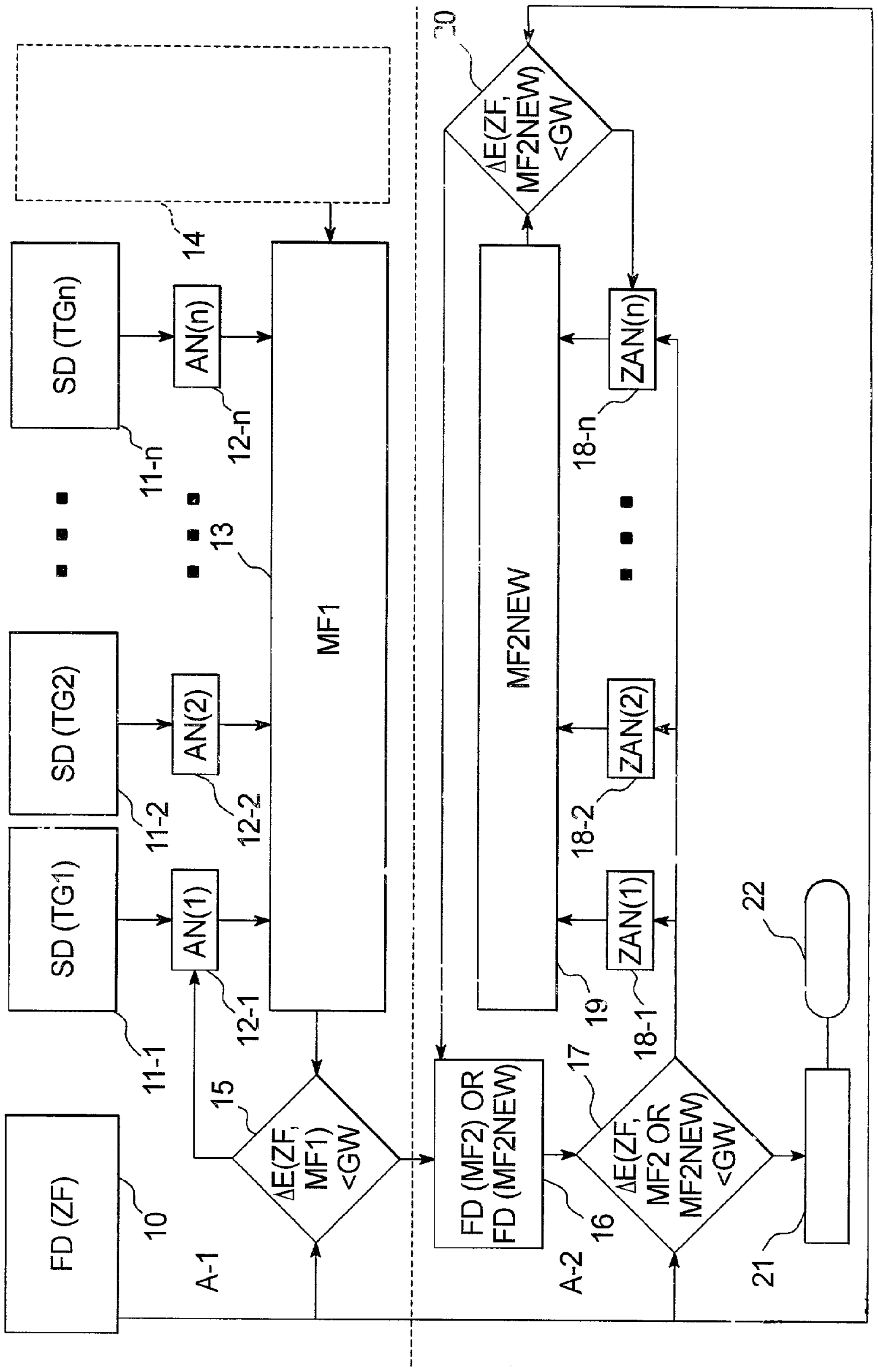
FD (ZF)
10
A-1
SD (TG1)
11-1
AN(1)
12-1
SD (TG2)
11-2
AN(2)
12-2
SD (TGn)
11-n
AN(n)
12-n
13
MF1
14
15
ΔE(ZF, MF1) <GW
FD (MF2) OR FD (MF2NEW)
16
A-2
17
ΔE(ZF, MF2 OR MF2NEW) <GW
18-1
ZAN(1)
18-2
ZAN(2)
18-n
ZAN(n)
19
MF2NEW
20
ΔE(ZF, MF2NEW) <GW
21
22

METHOD FOR PRODUCING A MIXED COLOR THAT IS MIXED FROM PRIMARY COLORS AND CORRESPONDS TO A PRESCRIBED TARGET COLOR

BACKGROUND OF THE INVENTION

For realizing, for example, customized colors that are employed for example, for company logos, it is meaningful to produce colors from a few primary colors in order to achieve the customized color (referred to below as target color). In this way, specific target colors can be achieved with a few primary colors that are actually present. Predictions about the required composition of the primary colors for achieving specific target colors must be made before production (for example, mixing with the assistance of agitators). This procedure is called color formulating.

Color formulating is know in conventional printing (for example, offset printing) and is frequently employed therein (for example, Billmeyer, F. W., Saltzman, M., *Principles of Color Technology,* New York, John Wiley & Sons Inc., 2000, Berns, R. S. (editor), 3rd edition, English). With the assistance of complex mathematical models and calibration data for the unmixed primary colors that are in fact physically present, for example CMYK, attempts are thereby made to make predictions about mixed colors. The basis for these calculations is that topically uniform mixed colors are present that can absorb and scatter light. Boundary surface effects and dependencies of the color layers on layer thickness are thereby also taken into consideration. Designationally achieving the target color without such formulating procedures is not possible because of the great number of colors (there are approximately 2 million different colors). The preparation and testing of recipes is complicated and time consuming in all printing processes.

The production of the reference proofs of the primary colors is very involved and is subject to fluctuations in all conventional color formulating systems. The determination of the required parameters is only approximately possible, and taking the underlying physical relationships mathematically into consideration is only possible given the application of approximations.

Customized colors are also produced with digital (for example, electrophotographic) printing methods. Given these methods, toner is often employed for the inking. The toner particles thereby comprise a size from a few μm through several 10 μm. Since the toner particles comprise the color of the respective basic toner and the toner diameter is large compared to the wavelength of light, a uniform color can no longer be assumed in these cases; the assumptions that are applied in color formulating in conventional printing no longer apply.

Some approaches with commercially available formulating systems have exhibited extremely great deviations between predicted color and color actually achieved given the employment of digital printing systems.

SUMMARY OF THE INVENTION

An object of the invention is to specify a method with which a desired color—the target color—can be calculated in advance. The method should be particularly employable for electrophotographic printing systems that employ toner for inking.

According to the method of the invention for producing a mixed color that corresponds to a prescribed target color and is mixed from primary colors, parts of the primary colors are respectively selected by use of measured spectral data of the primary colors and the mixed color and color data thereof is obtained from the measured spectral data. The color data of the mixed color and color data of the target color are compared to one another. Given non-satisfaction of a prescribed criterion in the comparison of the color data of the target color and the color data of the mixed color, individual ones of the selected parts of the primary colors are modified until the comparison meets the prescribed criterion.

BRIEF DESCRIPTION OF THE DRAWINGS

The drawing FIGURE is a block diagram of a method for producing a mixed color that corresponds to a prescribed target color and is mixed from primary colors.

DESCRIPTION OF THE PREFERRED EMBODIMENTS

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

The production method specifies a method in accordance with which the color data of the target color and of the mixed color achieved are compared to one another, and, given inequality (the difference between the color data of target color and mixed color does not meet a prescribed criterion, for example a tolerance value), the parts of the primary colors are varied until the criterion has been met. The mixed color corresponding to the target color can then be produced with the parts of the primary colors that have thus been determined.

It is advantageous when the calculation of the spectral data of the mixed color occurs given the assistance of additive and subtractive color mixing.

It is also expedient when the layer thickness of the mixed color is taken into consideration in the calculation.

The result is improved further when the mixed color obtained is printed by the printing system employed, and the color data of the printed mixed color are identified. A re-formulating can be implemented when the color data of the printed mixed color and of the target color are not similar. What can thus be achieved is that the ultimately printed mixed color corresponds to the target color.

Additive and/or subtractive color mixing can be utilized in the re-formulating. However, it is expedient to employ subtractive color mixing in the re-formulating.

The method is especially advantageous when basic toners that are utilized for inking in an electrophotographic printing system are employed as primary colors.

Advantages of the method are:

The plurality of formulating trials is reduced; this is especially important since, for example, the developer station of the electrophotographic printing system (or the printing units of conventional printing presses) must be cleaned after every trial.

The formulating precision is improved.

The number of re-formulations is reduced.

New basic toners can be added with little outlay.

The preparation of the reference data for the primary colors requires little outlay; in particular, no concentration graduations of the basic toners—mixed with transparent white—need be produced and printed given uniform layer thickness.

The method is particularly suited for toner-based printing methods.

The method is explained with the assistance of the FIGURE that shows a flowchart of the production method. The individual method steps are thereby represented by blocks.

In a first segment A-1 upon employment of a standard computer, the method determines the mixing ratio of the non-printed mixed color that is composed of primary colors and corresponds to the target color. In a further segment A-2, the printing system employed is involved in that the mixed color printed by it is checked to see whether it corresponds to the target color. For that purpose, the mixed color determined in the first segment A-1 is printed out by the printing system, the color data of the printed mixed color are measured, and the printed mixed color is then matched to the target color in a computer-assisted method.

Before the implementation of formulations, the primary colors must be printed on a reference paper in a defined layer thickness with the corresponding printing system. The spectral data of the primary colors in full tones can be determined from the sample prints with the assistance of spectral color measurement.

Proofs of a few mixtures having known composition can also be utilized for setting optional formulating parameters (of calibration data). The setting of the parameters then occurs by comparing calculated and measured color data of the mixed primary colors in that the deviations are minimized by variation of the parameters with a standard optimization method.

Segment A-1:

The measured color data FD(ZF) of the target color ZF form the point of departure (block 10).

A mixed color MF1 is calculated (block 13) from parts ANi (i=1 . . . n; blocks 12(*i*)) of the primary colors TGi (i=1 . . . n), namely upon employment of their spectral data SD(TGi) (blocks 11(*i*)). The spectral data SD(MF1) of the mixed color MF1 obtained are determined according to the following equation:

$$R_{mix}(\lambda)=x\cdot R_{subtr.}(\lambda)+(1-x\cdot R_{add.}(\lambda))$$

with:

x share of the subtractive color mixing in the overall color mixing $R_{subtr.}(\lambda)$ spectral reflection factor of the mixed primary color calculated according to the laws of subtractive color mixing $R_{add.}(\lambda)$ spectral reflection factor of the mixed primary color calculated according to the laws of additive color mixing $R_{mix}(\lambda)$ spectral reflection factor of the calculated mixed primary color The share of the subtractive color mixing x can be suitably selected for every printing system; calibration mixtures can thereby be utilized.

Additive and subtractive color mixing is utilized (block 13) in the color calculation. The equations for the additive and subtractive color mixing derive from:

Additive Color Mixing $$R_{add}(\lambda)=\sum_i R_i(\lambda)\cdot c_i$$

with $c_i$ concentration of the respective primary color

Ri(λ) spectral reflection factor of the respective primary color when it is printed alone as full surface.

Subtractive Color Mixing $$R_{subtr}(\lambda)=\prod_i R_i(\lambda)^{c_i}$$

with:

$c_i$ concentration of the respective primary color $R_i(\lambda)$ spectral reflection factor of the respective primary color when it is printed alone as full surface.

In order to improve the result, calibration data from test mixtures can be consulted in the calculation of the mixed primary color MF1 (block 14 shown with broken lines). For example, the following are included among the calibration data:

A gloss correction (for example, according to Saunderson):

$$R=K_1+\frac{(1-K_1)\cdot(1-K_2)\cdot R_{intern}}{1-K_2\cdot R_{intern}}$$

or inversely:

$$R_{intern}=\frac{R-K_1}{1-K_1-K_2+K_2\cdot R}$$

with $K_1$ reflection coefficient for directed light at the boundary surface at the transition from air → color layer.

$K_2$ reflection coefficient for diffuse light at the boundary surface at the transition from color layer → air.

$R_{intern}$ reflection factor effective in the color layer

R external reflection factor observed from the outside (Berns, page 165)

The ratio of additive or subtractive color mixing proceeding from test impressions with known ratio and the optimization thereof.

A layer thickness correction $$R_{mix}(d,\lambda)=y\cdot[x\cdot R_{subtr.}(\lambda)^{d1}+(1-x\cdot R_{add}(\lambda)^{d1})]+(1-y)\cdot[x\cdot R_{subtr}(\lambda)^{d2}+((1-x)\cdot R_{add.}(\lambda)^{d2})]$$

given layer thicknesses that deviate from the reference impressions or that vary topically.

Given different printing materials, these can be taken into consideration by means of a color correction, for example $$R_{mix,P2}(\lambda)=\frac{R_{P2}(\lambda)}{R_{P1}(\lambda)}R_{mix,P1}(\lambda)$$

These calibration data can be co-involved in the calculation of the mixed color MF1 (block 13).

The spectral data SD(MF1) of the mixed color MF1 are converted according to standard methods, for example into CIELAB standard color values FD(MF1).

A comparison of FD(ZF) to FD(MFi) is then implemented (block 15), for example according to $$\Delta E^*_{ab} = \sqrt{(L^*_{MFi} - L^*_{zf})^2 + (a^*_{MFi} - a^*_{ZF})^2 + (b^*_{MFi} - b^*_{ZF})^2}\,.$$

When the comparison of the color data FD of the target color ZF and the mixed color MF1 yields no identity or when the difference between the color values ΔE* remains, for example, above a prescribed tolerance limit, for example GW=2(ΔE*>GW), then the parts ANi of the primary color TGi are modified until the comparison (block 15) of the color data FD shows that the above tolerance limit GW has been reached or an optimum approximation has been reached or a prescribed, maximum plurality of iterations has been reached. The sub-method according to segment A-1 has thus been ended.

In order to take the properties of the printing system employed into consideration, the sub-method according to segment A-2 can be implemented.

Segment A-2:

For that purpose, the mixed color MF1 determined in the segment A-1 is printed out on a printing material, for example the paper employed, by the (for example, electrophotographic) printing system, and a color measurement (block 16) of the printed mixed color MF2 is then implemented for determining its color data FD(MF2).

When the comparison of the color data FD(ZF) of the target color ZF and the color data FD(MF2) of the printed mixed color MF2 exceed the tolerance limit (block 17), i.e. ΔE*(ZF;MF2)>GW applies, then additional parts ZANi (i=1 . . . n) of primary colors (blocks 18*i*) are added to the mixed color MF2 to form a mixed color MF2(new) until the tolerance limit (block 20) has been reached. It is thereby expedient to employ subtractive color mixing (block 19); however, additive color mixing or additive and subtractive color mixing, can also be utilized. The calculation of the spectral data SD of the modified mixed color MF2(new) ensues (block 19) according to the above-recited equations, whereby the measured mixed color MF2 is taken into consideration like a primary color.

The spectral data of the mixed color MF2(new) are again converted into color data, and the comparison of the modified mixed color MF(2) to the target color is then implemented (block 20) according to the equation $$\Delta E^*(ZF;MF2) \leqq GW.$$

The mixed color MF2(new) that has now been obtained is again printed out (block 16), the color data of the mixed color MF2(new) are measured, and the comparison (block 17) to the color data of the target color ZF is again subsequently implemented. The method is ended (block 21) only when this shows that ΔE*≦GW applies; otherwise, the steps according to blocks 18*i*, 19, 20, 16, 17 are repeated (re-formulating). The result of the method is then the mixed color MF3 that is printed, matches to the target color (block 21).

In the explanation of the method, a tolerance limit GW was selected as a criterion for the end of the method. Instead of prescribing the tolerance limit GW as a criterion for the end, it is also possible to prescribe a maximum plurality of passes (iterations) or, respectively, to end the method when further passes yield no improvement in the result.

When the color data of the printed target color are employed in the method, the printed mixed color MF3 is adapted to the printed target color.

The desired mixed color MF3 can then be produced (block 22) from the parts Ani and ZANi determined in segments A-1 and A-2.

For example, the CMYK colors (cyan, magenta, yellow, black), RGB colors (red, green, blue) and transparent can be employed as primary colors.

An estimate of the color data on various papers or an adaptation of a target color for a specific paper can, for example, occur according to the aforementioned equation.

LABELING OF THE BLOCKS IN THE FIGURE

Block Label
10 color data FD(ZF) of the target color ZF
11(*i*) spectral data SD(TGi) of the primary colors TGi
12(*i*) parts ANi of the primary colors TGi
13 calculating the color data FD(MF) of the mixed color MF1
14 calibration data
15 comparing FD(ZF) to FD(MF)
16 measuring the color data of the printed mixed color
17 comparing FD(ZF) to FD(MF2) or FD(MF2(new))
18*i* added parts ZANi of the primary colors TGi
19 calculation of the modified mixed color MF2(new)
20 comparing FD(ZF) to FD(MF2(new)
21 end of the calculating method
22 production of the mixed color MF3 (matched to ZF)

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim:

1. A method for producing a mixed toner color for printing by an electrophotographic printing system and mixed from primary toner colors and that corresponds to a prescribed target toner color, comprising the steps of:

selecting parts of the primary colors by use of measured spectral data of the primary toner colors and obtaining the mixed toner color and calculating color data of the mixed toner color from the measured spectral data with assistance of at least one of additive and subtractive color mixing;

comparing the color data of the mixed toner color and color data of the target toner color to one another; and given non-satisfaction of a prescribed criterion in the comparison of the color data of the target toner color and the color data of the mixed toner color, modifying individual ones of said selected parts of the primary toner colors until the comparison meets the prescribed criterion.

2. The method according to claim 1 wherein a calculation of the spectral data of the mixed color occurs with assistance of additive and subtractive color mixing.

3. The method according to claim 2 wherein a ratio of the additive and subtractive color mixing is determined by optimization upon employment of reference specimens having known recipes.

4. The method according to claim 1 wherein a layer thickness of the mixed color is taken into consideration in the calculation of the spectral data of the mixed color.

5. The method according to claim 1 wherein a gloss correction is implemented in the calculation of the mixed color.

6. The method according to claim 1 wherein printing material employed by the printing system is taken into consideration in the calculation of the mixed color.

7. The method according to claim 1 wherein the mixed color is printed on a printing material by said printing system employed and color data of a printed mixed color are measured;

the color data of the printed mixed color and of the target color are compared;

given non-satisfaction of the prescribed criterion, a mixing ratio of the mixed color is modified by adding additional parts of the primary colors, and spectral data of the modified mixed color and color data therefrom are calculated; and the color data of the target color and of the modified mixed color are compared to one another, and, given non-satisfaction of the criterion, additional parts of the primary colors are added until the criterion is met.

8. The method according to claim 7 wherein after the criterion is met, the mixed color that has now been determined is printed out, and the method is continued until comparison of the color values of the respectively printed mixed color and of the target color meet the criterion.

9. The method according to claim 7 wherein subtractive color mixing is employed in a mixture of the additional parts to the printed mixed color.

10. The method according to claim 1 wherein the criterion is met when a deviation of the color data lies below a prescribed tolerance limit.

11. The method according to claim 1 wherein the criterion is met when a defined plurality of iterations has been implemented.

12. The method according to claim 1 wherein the criterion is met when an improvement in matching of the color data of the printing systems occurs as a result of further iterations.

13. The method according to claim 1 wherein the colors and a transparent are employed as primary colors.

14. The method according to claim 1 wherein the color data of a printed target color are employed for the comparison to the mixed color to be determined.

15. The method according to claim 14 wherein a non-impact printing method is employed for printing the mixed color.

16. The method according to claim 1 wherein basic toner colors are employed as the primary colors.

17. The method according to claim 16 wherein an electrophotographic printing system is employed for printing the mixed color.

18. The method according to claim 1 wherein the mixed color that has been determined is employed for producing the mixed color corresponding to the target color.

19. A method for producing a mixed color mixed from primary colors and that corresponds to a prescribed target color, comprising the steps of:

selecting parts of the primary colors by use of measured spectral data of the primary colors and with at least one of additive and subtractive color mixing of the spectral data obtaining the mixed color;

comparing the color data of the mixed color and color data of the target color to one another; and given non-satisfaction of a prescribed criterion in the comparison of the color data of the target color and the color data of the mixed color, modifying individual ones of said selected parts of the primary colors until the comparison meets the prescribed criterion.

20. A method for producing a mixed color mixed from primary colors and that corresponds to a prescribed target color, comprising the steps of:

selecting parts of the primary colors by use of measured spectral data of the primary colors and obtaining the mixed color and calculating color data of the mixed color from the measured spectral data with the assistance of additive and subtractive color mixing, a ratio of the additive and subtractive color mixing being determined by optimization upon employment of reference specimens having known recipes;

comparing the color data of the mixed color and color data of the target color to one another; and given non-satisfaction of a prescribed criterion in the comparison of the color data of the target color and the color data of a mixed color, modifying individual ones of said selected parts of the primary colors until the comparison meets the prescribed criterion.

21. The method for producing a mixed color mixed from primary colors and that corresponds to a prescribed target color, comprising the steps of:

selecting parts of the primary colors by use of measured spectral data of the primary colors and obtaining the mixed color and calculating color data of the mixed color from the measured spectral data, a layer thickness of the mixed color being taken into consideration;

comparing the color data of a mixed color and color data of the target color to one another; and given non-satisfaction of a prescribed criterion in the comparison of the color data the target color and the color data of the mixed color, modifying individual ones of said selected parts of the primary colors until the comparison meets the prescribed criterion.

22. The method for producing a mixed color mixed from primary colors that corresponds to a prescribed target color, comprising the steps of:

selecting parts of the primary colors by use of measured spectral data of the primary colors and obtaining the mixed color and calculating color data of the mixed color, and wherein a gloss correction is implemented in the calculation of the mixed color;

comparing the color data of the mixed color and color data of the target color to one another; and given non-satisfaction of a prescribed criterion in the comparison of the color data of the target color and the color data of a mixed color, modifying individual ones of said selected parts of the primary colors until the comparison meets the prescribed criterion.

* * * * *